(12) United States Patent
Chyla et al.

(10) Patent No.: US 9,909,638 B2
(45) Date of Patent: Mar. 6, 2018

(54) HYDRAULIC SUSPENSION DAMPER WITH HYDRO-MECHANICAL STROKE STOP

(71) Applicant: BeijingWest Industries, Co., Ltd., Beijing (CN)

(72) Inventors: Lukasz Chyla, Cracow (PL); Waldemar Widla, Cracow (PL); Grzegorz Gasior, Ciezkowice (PL); Jakub Wrzesinski, Cracow (PL)

(73) Assignee: BEIJINGWEST INDUSTRIES CO., LTD., Beijing (CN)

( * ) Notice: Subject to any disclaimer, the term of this patent is extended or adjusted under 35 U.S.C. 154(b) by 0 days.

(21) Appl. No.: 15/367,301

(22) Filed: Dec. 2, 2016

(65) Prior Publication Data

US 2017/0159743 A1 Jun. 8, 2017

(30) Foreign Application Priority Data

Dec. 2, 2015 (CN) .......................... 2015 1 0870708

(51) Int. Cl.
*F16F 9/49* (2006.01)
*F16F 9/516* (2006.01)
(Continued)

(52) U.S. Cl.
CPC .............. *F16F 9/516* (2013.01); *B60G 13/08* (2013.01); *B60G 15/061* (2013.01); *B60G 17/08* (2013.01);
(Continued)

(58) Field of Classification Search
CPC ........... F16F 9/49; F15B 15/222; F15B 15/24; B60G 13/06; B60G 15/12
(Continued)

(56) References Cited

U.S. PATENT DOCUMENTS

| 3,207,498 A | 9/1965 | Wustenhagen et al. |
| 3,447,644 A | 6/1969 | Duckett |

(Continued)

FOREIGN PATENT DOCUMENTS

| CN | 101915280 A | 12/2010 |
| CN | 102537177 A | 7/2012 |

(Continued)

OTHER PUBLICATIONS

European Search Report dated Apr. 4, 2017, Nine (9) Pages.

(Continued)

*Primary Examiner* — Christopher P Schwartz
(74) *Attorney, Agent, or Firm* — William H. Honaker; Dickinson Wright, PLLC

(57) ABSTRACT

A hydraulic suspension damper includes a tube having an opened end and a closed end defining a compartment. A main piston is disposed in the compartment dividing the compartment into a compression chamber and a rebound chamber. A piston rod is attached to the main piston. A rod guide is disposed at said opened end. A stroke stop arrangement includes an insert and an additional piston attached to the piston rod. The insert has a narrowed section including an inner surface defining at least one recess between the distal end and the rod guide and extends axially along the insert in fluid communication with the compression chamber for allowing working liquid flow from the rebound chamber to the compression chamber during the rebound stroke. The at least one recess includes three recesses disposed equidistantly and spaced from one another.

17 Claims, 3 Drawing Sheets

(51) Int. Cl.
*F16F 9/19* (2006.01)
*B60G 13/08* (2006.01)
*B60G 15/06* (2006.01)
*F16F 9/36* (2006.01)
*F16F 13/00* (2006.01)
*B60G 17/08* (2006.01)
*F16F 9/06* (2006.01)

(52) U.S. Cl.
CPC ............... *F16F 9/19* (2013.01); *F16F 9/36* (2013.01); *F16F 13/007* (2013.01); *B60G 2500/10* (2013.01); *B60G 2800/16* (2013.01); *F16F 9/065* (2013.01); *F16F 2228/066* (2013.01)

(58) Field of Classification Search
USPC .................... 188/288; 267/120, 224, 226
See application file for complete search history.

(56) References Cited

U.S. PATENT DOCUMENTS

| | | | |
|---|---|---|---|
| 3,598,205 | A | 8/1971 | Kenyon |
| 4,230,309 | A | 10/1980 | Schnitzius |
| 4,345,748 | A * | 8/1982 | Wossner ............ B60G 15/061 188/322.17 |
| 4,635,908 | A | 1/1987 | Ludwig |
| 4,796,871 | A | 1/1989 | Bauer et al. |
| 4,964,625 | A | 10/1990 | Kawamura |
| 5,501,438 | A * | 3/1996 | Handke ............ F16F 9/49 267/221 |
| 6,032,961 | A | 3/2000 | Pradel et al. |
| 2001/0025753 | A1 | 10/2001 | Pfundstein et al. |
| 2005/0178624 | A1 | 8/2005 | Nagai |
| 2007/0114103 | A1* | 5/2007 | Born ............ F16F 9/0218 188/284 |
| 2008/0088070 | A1 | 4/2008 | Mori et al. |
| 2010/0090931 | A1* | 4/2010 | Kawabe ............ G09G 3/3233 345/76 |
| 2012/0090931 | A1 | 4/2012 | Krazewski et al. |
| 2014/0360353 | A1* | 12/2014 | Baalmann ............ F16F 9/49 92/143 |
| 2015/0090548 | A1* | 4/2015 | Yamanaka ............ F16F 9/3221 188/297 |
| 2015/0247549 | A1* | 9/2015 | Takeno ............ F16F 9/49 188/297 |

FOREIGN PATENT DOCUMENTS

| | | |
|---|---|---|
| DE | 3010690 A1 | 9/1981 |
| DE | 19626143 A1 | 1/1998 |
| DE | 10016641 A1 | 10/2001 |
| DE | 102011089140 B3 | 3/2013 |
| EP | 2302252 A1 | 3/2011 |
| GB | 949426 | 6/1961 |
| GB | 998742 | 3/1962 |
| GB | 2014694 A | 8/1979 |
| GB | 2241046 A | 8/1991 |
| JP | S5582834 | 6/1980 |
| JP | 2001330073 A | 11/2001 |
| JP | 201568428 | 4/2015 |
| WO | 2005106282 A1 | 11/2005 |

OTHER PUBLICATIONS

First Office Action issued for corresponding Japanese Patent Application 2016-220844 (dated Oct. 24, 2017) (7 pages).
First Office Action issued for counterpart Korean patent application No. 10-2016-0148205 (dated Nov. 21, 2017) (16 pages).

\* cited by examiner

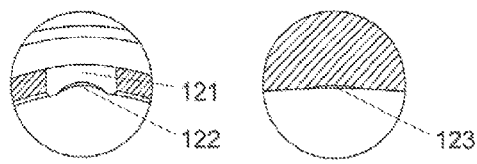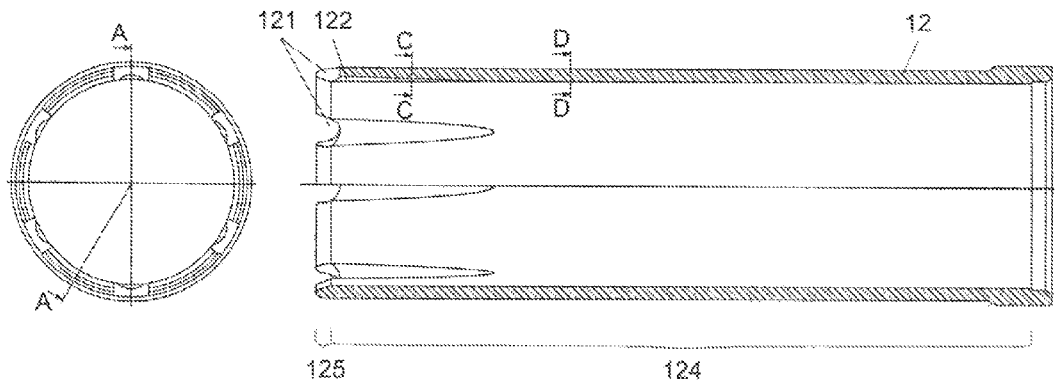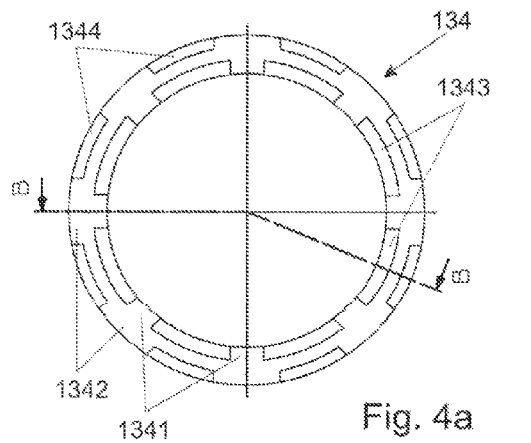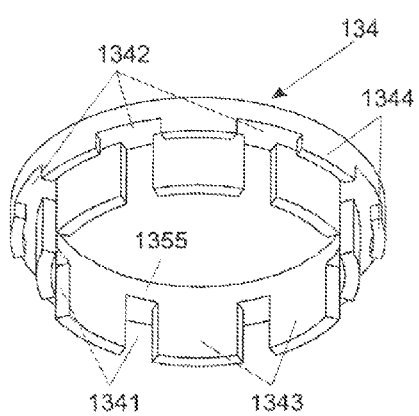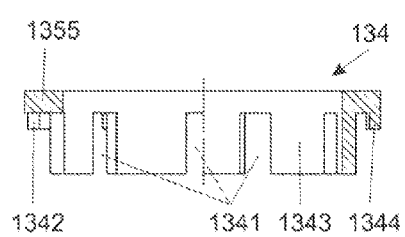

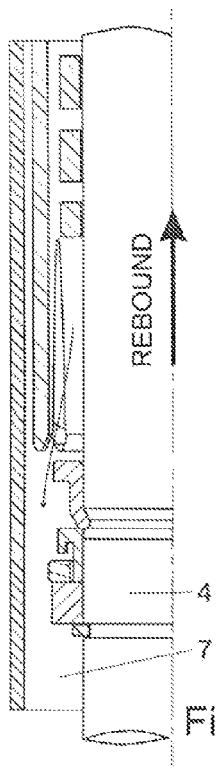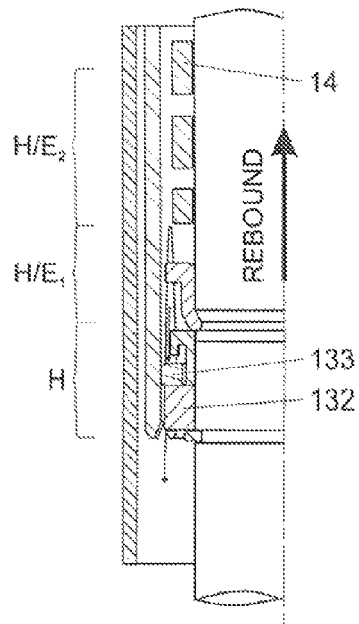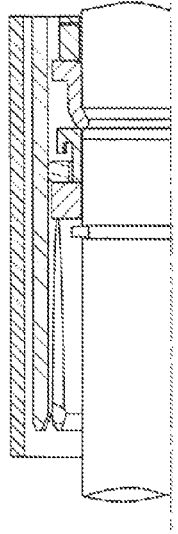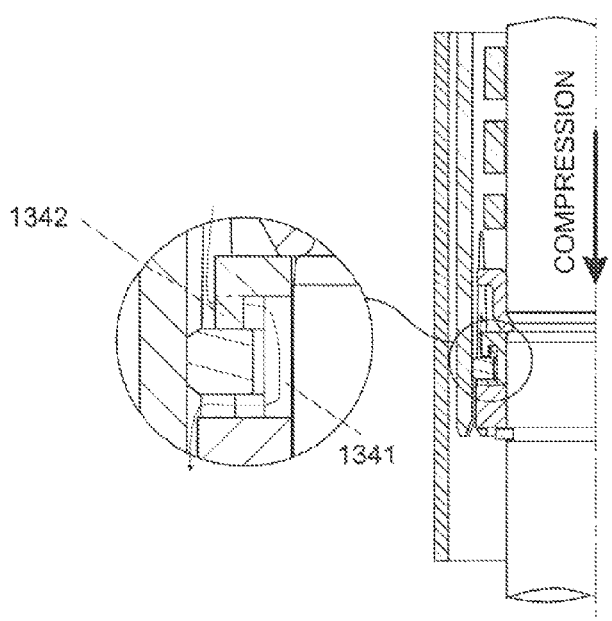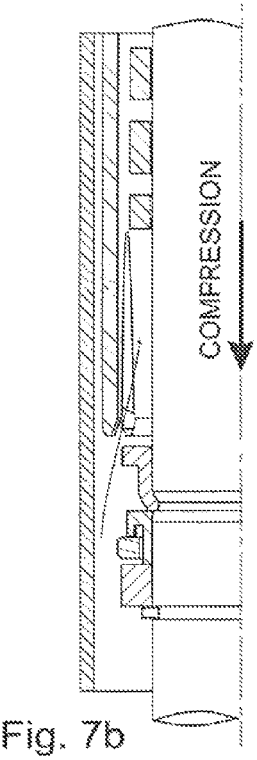

US 9,909,638 B2

HYDRAULIC SUSPENSION DAMPER WITH HYDRO-MECHANICAL STROKE STOP

CROSS REFERENCE TO RELATED APPLICATION

This application claims the priority to Chinese Patent Application Serial No. CN201510870708.7 filed on Dec. 2, 2015 and entitled "Hydraulic Suspension Damper with a Hydro-mechanical Stroke Stop."

BACKGROUND OF THE INVENTION

1. Field of the Invention

The present invention relates generally to a hydraulic suspension damper assembly.

2. Description of the Prior Art

Such a hydraulic suspension damper assembly is disclosed in an article by the Society of Automotive Engineers (SAE) titled "BWI Engineers Develop Improved Rebound Stop Performance." The figures in the article discloses the hydraulic suspension damper assembly including a tube disposed on a center axis extending between an opened end and a closed end defining a compartment for containing a working liquid. A main piston is slidably disposed in the compartment and divides the compartment into a compression chamber and a rebound chamber. The compression chamber extends between the main piston and the closed end. The rebound chamber extends between the main piston and the opened end. A piston rod is attached to the main piston and is axially movable along the center axis between a compression stroke and a rebound stroke. During the compression stroke, the main piston moves toward the closed end. During the rebound stroke, the main piston moves toward the opened end. A rod guide is disposed at the opened end for receiving the piston rod.

A stroke stop arrangement including an insert is disposed in the rebound chamber. The insert has a narrowed section including an inner surface extending outwardly from the rod guide and tapering to a distal end defining an inlet for allowing the working liquid to flow into the insert and providing additional damping force in response to an axial movement of the piston rod and the main piston. The stroke stop arrangement includes an additional piston disposed in the rebound chamber and attached to the piston rod between the rod guide and the main piston and slidable in the insert to provide additional damp force during the rebound stroke.

European Patent EP2302252 or U.S. Pat. No. 3,447,644 discloses a hydraulic suspension damper including a stroke stop arrangement including an insert. The insert has a narrowed section including an inner surface extending outwardly from the rod guide and tapering to a distal end defining an inlet for allowing the working liquid to flow into the insert and providing additional damping force in response to an axial movement of the piston rod and the main piston. The narrowed section defines at least one axial groove extending from the narrowed section, toward the rod guide, parallel to the center axis to a proximate end.

United Kingdom Patent GB2014694 discloses a hydraulic suspension damper including a tube disposed on a center axis extending between an opened end and a closed end defining a compartment for containing a working liquid. A main piston is slidably disposed in the compartment and divides the compartment into a compression chamber and a rebound chamber. The compression chamber extends between the main piston and the closed end. The rebound chamber extends between the main piston and the opened end. A main piston is slidably disposed in the compartment and divides the compartment into a compression chamber and a rebound chamber. A piston rod is attached to the main piston and is axially movable along the center axis between a compression stroke and a rebound stroke. A rod guide is disposed at the opened end for receiving the piston rod.

A stroke stop arrangement including an additional piston is disposed in the rebound chamber and attached to the piston rod between the rod guide and the main piston and slidable in the insert to provide additional damp force during the rebound stroke. A spring is disposed in the rebound chamber and extends helically about the piston rod between the additional piston and the rod guide for providing elastic damping force during the rebound stroke

SUMMARY OF THE INVENTION

The invention provides for a hydraulic suspension damper assembly including a stroke stop arrangement having an insert wherein the inner surface of the narrowed section defines at least one recess extending between the distal end and the rod guide and axially along the insert and disposed in fluid communication with the compression chamber for allowing the working liquid to flow from the rebound chamber to the compression chamber in response to the main piston and the additional piston moving from the compression stroke to the rebound stroke.

The invention in its broadest aspect provides a hydraulic suspension damper with a stroke stop arrangement of a simple construction providing a smooth increase of damping force at the end of the rebound stroke.

It is another aspect of the present invention to provide a hydraulic suspension damper that is cost efficient and simple to manufacture and having excellent damper tuning capabilities.

BRIEF DESCRIPTION OF THE DRAWINGS

Other advantages of the present invention will be readily appreciated, as the same becomes better understood by reference to the following detailed description when considered in connection with the accompanying drawings wherein:

FIG. 3a is a front view of the insert of the stroke stop arrangement including the radial grooves and the axial grooves, FIG. 3b is a cross-sectional view along the plane A-A of FIG. 3a, FIG. 3c is an enlarged fragmentary cross-section view along the plane C-C of FIG. 3b, FIG. 3d is an enlarged fragmentary cross-sectional view along the plane D-D of FIG. 3b;

FIG. 4a is a bottom view of the shaped sleeve including the inner axial rim, the axial channels, and the radial channels;

FIG. 4b is a cross-sectional side view of the shaped sleeve along the plane B-B of FIG. 4a;

FIG. 4c is a perspective view of the shaped sleeve;

FIG. 5a is a fragmentary cross-sectional side view of the rebound stroke stop arrangement during the rebound stroke wherein the shaped sleeve is spaced from the insert;

FIG. 5b is a fragmentary cross-sectional side view of the rebound stroke stop arrangement during the rebound stroke wherein the shaped sleeve is engaging the insert;

FIG. 6 is a fragmentary cross-sectional side view of the rebound stroke stop arrangement shown at the end of the rebound stroke; and FIG. 7a is a fragmentary cross-sectional side view of the rebound stroke stop arrangement during the compression stroke wherein the shaped sleeve is engaging the insert; and FIG. 7b is a fragmentary cross-sectional side view of the rebound stop arrangement during the compression stroke wherein the shaped sleeve is space from the insert.

DESCRIPTION OF THE ENABLING EMBODIMENT

Figure 1:
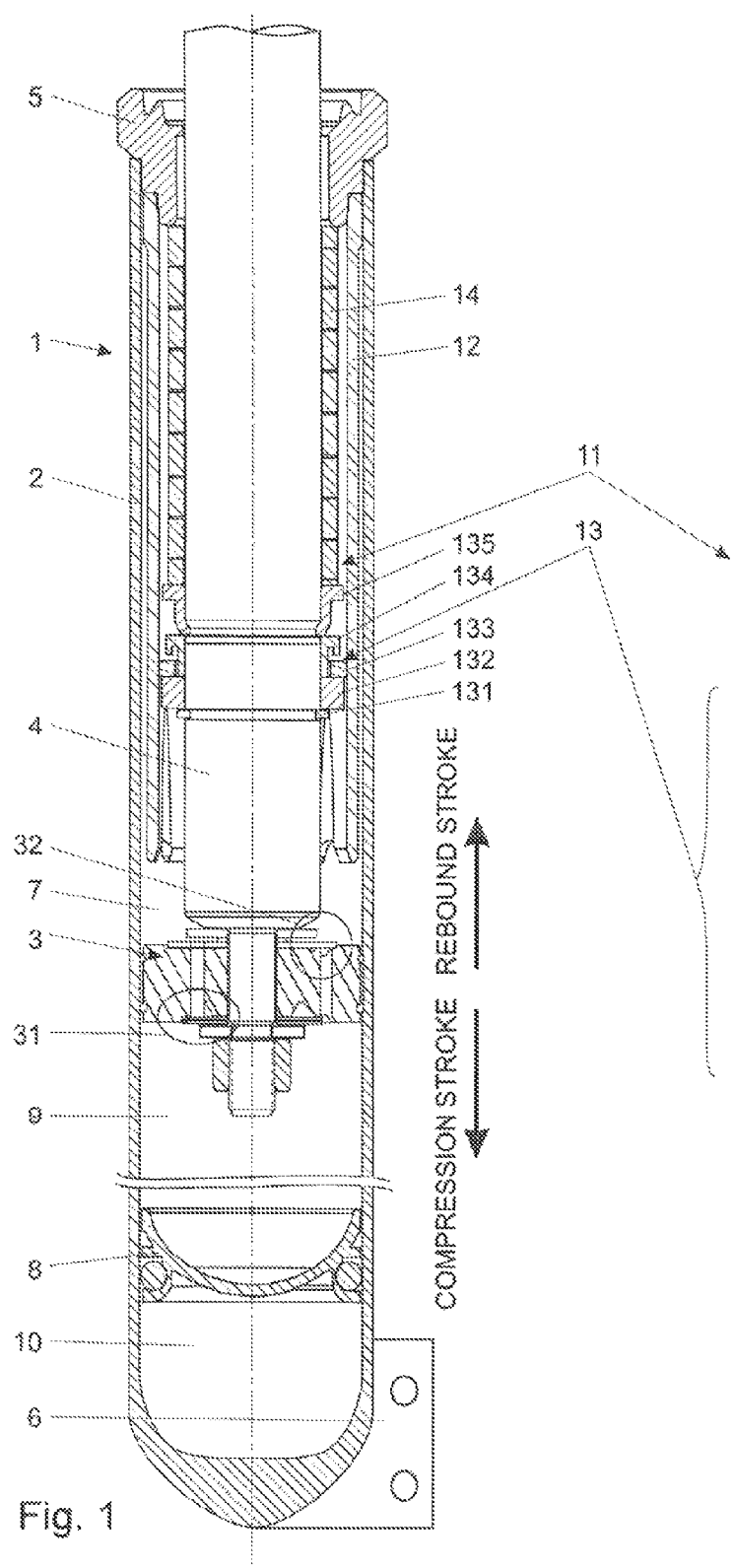
FIG. 1 is a cross-sectional view of an embodiment of a damper according to the present invention at the end of the rebound stroke.

Referring to the Figures, wherein like numerals indicate corresponding parts throughout the several views, a hydraulic suspension damper 1 assembly is generally shown in FIG. 1.

The hydraulic suspension damper 1 may be used in a vehicle suspension. The hydraulic suspension damper 1 includes a tube 2 having a cylindrical shape disposed on a center axis. The tube 2 extends between an opened end and a closed end defining a compartment, extending along the center axis, between the opened end and the closed end for containing a working liquid. A main piston 3 having a generally cylindrical shape is slidably disposed on the center axis, in the compartment, and abuts the tube 2. The main piston 3 divides the compartment into a rebound chamber 7 and a compression chamber 9. The rebound chamber 7 extends between the opened end of the tube 2 and the main piston 3. The compression chamber 9 extends between the closed end and the main piston 3. An attachment means 6 is disposed at the closed end of the tube 2 to fix the tube 2 to a swing arm supporting the wheels of a vehicle. Alternatively, the attachment means 6 may also be used to fix the hydraulic suspension damper 1 to a steering knuckle of the vehicle.

A piston rod 4, having a cylindrical shape, is disposed on the center axis, in the rebound chamber 7, attached to the main piston 3. The piston rod 4 extends outwardly from the main piston 3 through the opened end of the tube 2 and axially moveable along the center axis between a rebound stroke and a compression stroke. During the rebound stroke, the main piston 3 is moved long the center axis and toward the opened end of the tube 2. During the compression stroke, the main piston 3 is moved along the center axis toward the closed end. A rod guide 5 having a cylindrical shape is disposed at the opened end of the tube 2. The rod guide 5 defines a bore having a cylindrical shape disposed on the center axis and extends through the rod guide 5 for receiving the piston rod 4. The rod guide 5 includes a projection, disposed spaced from the opened end of the tube 2, extending radially outwardly from the rod guide 5, and annularly about the center axis defining a shoulder extending between the tube 2 and the projection.

The main piston 3 defines a plurality of passages disposed in a parallel relationship with the center axis and through the main piston 3 for allowing the working liquid to flow through the passages of the main piston 3 during the rebound stroke and the compression stroke. The main piston 3 includes a rebound valve 31 of a plurality of discs, each having a circular shape, disposed in the compression chamber 9 and concentric to the piston rod 4. The rebound valve 31 is attached to the main piston 3 for restricting the working liquid flow through the passages of the main piston 3 during the rebound stroke. The main piston 3 further includes a compression valve 32 of a plurality of discs, each having a circular shape, disposed in the rebound chamber 7 and concentric to the main piston 3 rod. The rebound valve 31 is attached to the main piston 3 for restricting the working liquid flow through the passages of the main piston 3 during the compression stroke.

A slidable partition 8 is disposed on the center axis concentric to the main piston 3 and moveable along the center axis in the rebound chamber 7 defining a gas chamber 10 extending between the closed end of the tube 2 and the slidable partition 8 for containing a pressurized gas. As it is known to those who are skilled in the art, in a twin-tube hydraulic suspension damper 1, instead of the slidable partition 8, an additional base 1355 valve assembly is disposed adjacent to the closed end of the tube 2. In addition, an external tube 2 is disposed annularly about the tube 2 to define an additional compression chamber 9 between the tube 2 and the external tube 2.

Figure 2:
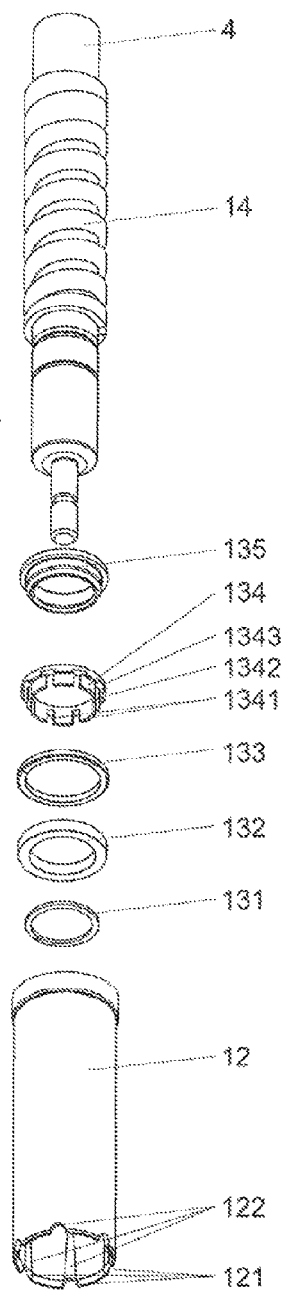
FIG. 2 is a perspective exploded view of the stroke stop arrangement shown in FIG. 1.

The hydraulic damper further includes a stroke stop arrangement 11 disposed in the rebound chamber 7 of the tube 2 for providing additional damping force in response to an axial movement of the piston rod 4 and the main piston 3. It should be appreciated that the stroke stop arrangement 11 may be disposed at the end of the compression chamber 9 to function as a compression stroke stop arrangement. As best shown in FIG. 2, the stroke stop arrangement 11 includes an insert 12 having a tubular shape and made from plastic. The insert 12 is disposed on the center axis, in the rebound chamber 7, between the piston rod 4 and the tube 2 and in a concentric relationship with the tube 2 and the piston rod 4. The insert 12 is attached to the shoulder of the rod guide 5, extending annularly about the center axis, outwardly from the rod guide 5 toward the closed end of the tube 2.

The insert 12, as best shown in FIGS. 3a-3d, has a narrowed section 124, made of plastic, including an inner surface extending outwardly from the rod guide 5 and annularly about the center axis. This provides simplicity in the construction of the hydraulic suspension damper 1 and the insert 12 is an additional add-on to the hydraulic suspension damper 1 providing additional tuning options for the hydraulic suspension damper 1. The narrow section tapers to a distal end defining an inlet 125 of conical shape in cross-section for allowing the working liquid to flow into the insert 12. It should be appreciated that the narrowed section 124 may easily be formed by proper internal shaping. The inner surface of the narrowed section 124 defining at least one radial groove 121 having an arcuate shape. The at least one radial groove 121 includes at least six radial grooves 121 each having an arcuate shape and disposed equidistantly spaced from one another. Such a shaping of the radial grooves 121 provides a smooth increase of damping force in the region of the inlet 125. The inner surface of the narrowed section 124 further defines at least one axial groove 122 including a plurality of six axial grooves 122, each having a conical shape, and defining a depth. The axial grooves 122 extends from the narrowed section 124, toward the rod guide 5, parallel to the center axis to a proximate end with the depth gradually decrease from the inlet 125 to the proximate end for restricting the working liquid flow into the insert 12.

An additional piston 13 is disposed in the rebound chamber 7 and attached to the piston rod 4 between the rod guide 5 and the main piston 3. The additional piston 13 is slidable in the insert 12, spaced from the rod guide 5 and the main piston 3, along the center axis to provide additional damping force during the rebound stroke. The additional piston 13 includes a bumper 135 disposed in the rebound chamber 7 and attached to the piston rod 4 between the rod guide 5 and the main piston 3. The bumper 135 extends outwardly from the piston rod 4 defining a seat. A spring 14 is disposed in the rebound chamber 7 and extends helically about the piston rod 4 between the seat of the bumper 135 and the projection of the rod guide 5 for providing elastic damping force during the rebound stroke.

The additional piston 13 includes a shaped sleeve 134, as best shown in FIGS. 4a-4c, having an inner axial rim 1343, having a cylindrical shape and made of plastic, disposed adjacent to the bumper 135. The shaped sleeve 134 extends between an upper surface disposed adjacent to the main piston 3 and a base 1355 disposed adjacent to the bumper 135. The inner axial rim 1343 defines at least one axial channel 1341 extending axially from the upper surface toward the base 1355 and terminating before the base 1355 parallel to the center axis for allowing the working liquid to flow radially through the shaped sleeve 134. The at least one axial channel 1341 includes a plurality of eight axial channels 1341 with each of the axial channels 1341 disposed equidistantly spaced from one another.

A supporting sleeve 132 having a circular shape is disposed adjacent to the upper surface of the inner axial rim 1343 and extends annularly outwardly from the center axis. A sealing ring 133, having a circular shape and made from metal, is disposed annularly about the inner axial rim 1343 of the shaped sleeve 134 between the upper surface and the base 1355. The sealing ring 133 is movable along the center axis between an unblocked position and a blocked position. In unblocked position, the sealing ring 133 is disposed adjacent to the base 1355 to establish fluid communication between the rebound chamber 7, the compression chamber 9, and the axial channels 1341 during the compression stroke. In the blocked position, the sealing ring 133 is disposed adjacent to the upper surface to close fluid communication between the rebound chamber 7, the axial channel 1341, and the compression chamber 9 to provide additional damping force during the rebound stroke. A retaining ring 131, having a circular shape, is attached to the piston rod 4. The retaining ring 131 extends annularly about the piston rod 4 and abuts the supporting sleeve 132 to secure the supporting sleeve 132 and the inner axial rim 1343 between the bumper 135 and the retaining ring 131.

The base 1355 of the inner axial rim 1343 includes a catch extending radially outwardly from the base 1355 of the inner axial rim 1343. The base 1355 further includes an outer axial rim 1344, extending outwardly from the catch, spaced from the inner axial rim 1343 parallel to the center axis toward the upper surface of the center axis for receiving the sealing ring 133 in the unblocked position. The outer axial rim 1344 defines at least one radial channel 1342 disposed in fluid communication with the axial channels 1341 to allow the working liquid to flow through the shaped sleeve 134. The at least one radial channel 1342 includes a plurality of eight radial channels 1342 with each of the radial channels 1342 disposed equidistantly from one another and in fluid communication with the axial channels 1341. It should be appreciated that, instead of plastic, the shaped sleeve 134 may be formed using any other materials which the radial channels 1342 and the axial channels 1341 may be conveniently formed.

The inner surface of the narrowed section 124 defines at least one recess 123 extending between the distal end and the rod guide 5, axially along the insert 12, and disposed in fluid communication with the compression chamber 9 for allowing the working liquid to flow from the rebound chamber 7 to the compression chamber 9 in response to the main piston 3 and the additional piston 13 moving from the compression stroke and the rebound stroke. The at least one recess 123 includes a plurality of three recesses 123 disposed equidistantly and spaced from one another.

The operation of the stroke stop arrangement 11 is best shown in FIGS. 5 to 7. During the rebound stroke, as shown in FIG. 5a, the additional piston 13 is moving towards the inlet 125 and the narrowed section 124 of the insert 12. At this time, the working liquid may easily flow from inside the narrowed section 124 of the insert 12 to the compression chamber 9.

As shown in FIG. 5b, during the rebound stroke, when the additional piston 13 enters the insert 12 through the inlet 125, the seal ring makes a sliding fit with the inner surface of the narrowed section 124. At this point, fluid pressure builds up between the sealing ring 133 and the rod guide 5 thereby pushing the sealing ring 133 to the blocked position wherein the working liquid may only flow through the axial grooves 122 generating an additional damping force proportion not only to the velocity of the piston rod 4 but also to the position of the piston rod 4 because the depth of the axial grooves 122 gradually diminishes. This is defined as a hydraulic damping zone "H" with respect to the top surface of the sealing ring 133.

At a certain point during the rebound stroke, the seat of the bumper 135 makes contact with the spring 14 and compresses the spring 14. At this point, the damping force is created by the limited flow of the working liquid through the axial grooves 122 and the force of the compressed spring 14. This is defined as a first hydro/elastic damping zone "$H/E_1$."

As shown in FIG. 6, near the end of the rebound stroke, as the additional piston 13 moves past the axial grooves 122, the working liquid can no longer flow through the axial grooves 122 and the additional piston 13. At this point, a large damping force is provided almost solely by the spring 14 and the working liquid can only flow to the compression chamber 9 through the recesses 123. This is defined as a second hydro/elastic damping zone "$H/E_2$."

As shown in FIG. 7a, during the compression stroke, the main piston 3 and the additional piston 13 move toward the closed end of the tube 2. Accordingly, the fluid pressure pushes the sealing ring 133 toward the shaped sleeve 134 to allow the working liquid to flow from the compression chamber 9 to the rebound chamber 7 through the radial channels 1342 and the axial channels 1341 until the additional piston 13 leaves the narrowed section 124 of the insert 12. In other words, the shaped sleeve 134 and the sealing ring 133 form a return valve that opens only during the compression stroke enabling the working liquid to flow through the additional piston 13 during the compression stroke.

The damper with the stroke stop arrangement 11 according to the present invention enables for various configurations of the respective hydraulic, elastic, and hydro/elastic zones ("H", "E", and "H/E") to achieve a desired damping characteristics for a hydraulic suspension damper 1. For example, the spring 14 may have a length longer than the length of the narrowed section 124. In such case, there would be only two damping zones, elastic zone ("E") beginning at the point of contact between the bumper 135 and the spring 14 and hydro/elastic zone ("H/E") beginning at the point when the sealing enters the narrowed section 124. If the spring 14, in its neutral position, has a length equal to the length of the narrowed section 124, there is only one hydro elastic zone ("H/E") beginning at the point when the sealing ring 133 enters the narrowed section 124 and at the point when the bumper 135 engages the spring 14. Finally, if the length of the spring 14 is shorter than the narrowed section 124, the hydraulic suspension would operate as shown in FIGS. 5 to 7.

The above embodiments of the present invention are merely exemplary. The figures are not necessarily to scale, and some features may be exaggerated or minimized. These and other factors, however, should not be considered as limiting to the scope of the invention.

Obviously, many modifications and variations of the present invention are possible in light of the above teachings and may be practiced otherwise than as specifically described while within the scope of the appended claims. These antecedent recitations should be interpreted to cover any combination in which the inventive novelty exercises its utility. The use of the word "said" in the apparatus claims refers to an antecedent that is a positive recitation meant to be included in the coverage of the claims whereas the word "the" precedes a word not meant to be included in the coverage of the claims. In addition, the reference numerals in the claims are merely for convenience and are not to be read in any way as limiting.

What is claimed is:

1. A hydraulic damper (1), comprising a tube (2) filled with a working liquid, a main piston assembly (3) disposed slidably inside the tube (2), attached to a piston rod (4) led outside the damper (1) through a sealed piston rod guide (5) and dividing the tube (2) into a rebound chamber (7) and a compression chamber (9), rebound (31) and compression (32) valve assemblies to control the flow of the working liquid within the tube (2) during rebound and compression stroke of the damper (1), wherein at least one end of the tube (2) is provided with an additional stroke stop arrangement (11) comprising:
 a narrowed section (124) of a diameter smaller than the diameter of the tube (2), having an inlet (125) opening to the tube (2) and provided at least partially with at least one axial groove (122) having the cross-sectional area decreasing from said inlet (125) along said narrowed section (124),
 a spring (14) disposed at least partially in said narrowed section (124) of the tube (2) and secured to said at least one end of the tube (2), and
 an additional piston assembly (13) having a diameter smaller than the diameter of the tube (2), displaceable along with the main piston assembly (3) apt to be slidably disposed in said narrowed section (124) of the tube (2) and apt to engage said spring (14) to generate additional damping force,
 said additional piston assembly (13) is further provided with
 a shaped sleeve (134) distal with respect to the main piston assembly (3),
 a sealing ring (133) apt to make a sliding fit with the internal wall of said narrowed section (124) of the tube (2), and
 a supporting sleeve (132) proximal with respect to the main piston assembly (3),
 wherein the sealing ring (133) surrounds an inner axial rim (1343) of the shaped sleeve (134) and is axially displaceable between the supporting sleeve (132) and an outer axial rim (1344) of the shaped sleeve (134) and wherein the inner axial rim (1343) defines at least one axial channel (1341) in fluid connection with at least one radial channel (1342) defined in the outer axial rim (1344).

2. The hydraulic damper according to claim 1, wherein said inlet (125) of said narrowed section (124) of the tube (2) has a form of a conical section.

3. The hydraulic damper according to claim 2, wherein said inlet (125) of said narrowed section (124) of the tube (2) is provided with at least one radial groove (121) that extends into said narrowed section (124) and joins with said at least one axial groove (122).

4. The hydraulic damper according to claim 3, wherein said additional piston assembly (13) is further provided with a bumper (135) apt to engage said spring (14) and secured to the piston rod (4).

5. The hydraulic damper according to claim 4, wherein said stroke stop arrangement (11) is a rebound stroke stop arrangement.

6. The hydraulic damper according to claim 2, wherein said stroke stop arrangement (11) is a rebound stroke stop arrangement.

7. The hydraulic damper according to claim 3, wherein said stroke stop arrangement (11) is a rebound stroke stop arrangement.

8. The hydraulic damper according to claim 2, wherein said additional piston assembly (13) is further provided with a bumper (135) apt to engage said spring (14) and secured to the piston rod (4).

9. The hydraulic damper according to claim 8, wherein said stroke stop arrangement (11) is a rebound stroke stop arrangement.

10. The hydraulic damper according to claim 1, wherein said inlet (125) of said narrowed section (124) of the tube (2) is provided with at least one radial groove (121) that extends into said narrowed section (124) and joins with said at least one axial groove (122).

11. The hydraulic damper according to claim 10, wherein said additional piston assembly (13) is further provided with a bumper (135) apt to engage said spring (14) and secured to the piston rod (4).

12. The hydraulic damper according to claim 11, wherein said stroke stop arrangement (11) is a rebound stroke stop arrangement.

13. The hydraulic damper according to claim 10, wherein said stroke stop arrangement (11) is a rebound stroke stop arrangement.

14. The hydraulic damper according to claim 1, wherein said additional piston assembly (13) is further provided with a bumper (135) apt to engage said spring (14) and secured to the piston rod (4).

15. The hydraulic damper according to claim 14, wherein said stroke stop arrangement (11) is a rebound stroke stop arrangement.

16. The hydraulic damper according to claim 1, wherein said narrowed section (124) of the tube (2) has a form of an insert (12) made of plastic.

17. The hydraulic damper according to claim 1, wherein said stroke stop arrangement (11) is a rebound stroke stop arrangement.

* * * * *